United States Patent
Oi et al.

(10) Patent No.: US 12,165,421 B2
(45) Date of Patent: Dec. 10, 2024

(54) DECELERATION DETECTION APPARATUS

(71) Applicant: Honda Motor Co., Ltd., Tokyo (JP)

(72) Inventors: Akinori Oi, Wako (JP); Kenta Ishii, Wako (JP); Yuya Kaneda, Wako (JP); Tatsuya Konishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 289 days.

(21) Appl. No.: 17/676,745

(22) Filed: Feb. 21, 2022

(65) Prior Publication Data
US 2022/0309801 A1    Sep. 29, 2022

(30) Foreign Application Priority Data
Mar. 24, 2021 (JP) ................................. 2021-049352

(51) Int. Cl.
| | |
|---|---|
| *G06V 20/58* | (2022.01) |
| *G06T 7/20* | (2017.01) |
| *G06V 10/60* | (2022.01) |
| *B60W 30/09* | (2012.01) |
| *G01S 13/86* | (2006.01) |
| *G01S 13/931* | (2020.01) |

(52) U.S. Cl.
CPC ............. *G06V 20/584* (2022.01); *G06T 7/20* (2013.01); *G06V 10/60* (2022.01); *B60W 30/09* (2013.01); *B60W 2554/404* (2020.02); *B60W 2555/20* (2020.02); *B60W 2720/10* (2013.01); *G01S 13/865* (2013.01); *G01S 13/867* (2013.01); *G01S 13/931* (2013.01); *G06T 2207/30252* (2013.01); *G06V 2201/08* (2022.01)

(58) Field of Classification Search
CPC ....... G06V 20/584; G06T 2207/30252; B60W 2555/20; B60W 30/09
See application file for complete search history.

(56) References Cited

U.S. PATENT DOCUMENTS

| | | | |
|---|---|---|---|
| 2018/0137380 A1* | 5/2018 | Alrefai | .................. B60T 7/22 |
| 2019/0202354 A1* | 7/2019 | Shiga | .................. G01C 21/34 |
| 2020/0004267 A1 | 1/2020 | Huang et al. | |

FOREIGN PATENT DOCUMENTS

| | | | |
|---|---|---|---|
| JP | 2005329779 A | 12/2005 | |
| JP | 2021043703 A | 3/2021 | |

OTHER PUBLICATIONS

Japanese Office action; Application 2021-049352; Sep. 17, 2024.

* cited by examiner

*Primary Examiner* — Myron Wyche
(74) *Attorney, Agent, or Firm* — Duft & Bornsen, PC

(57) ABSTRACT

A deceleration detection apparatus including an object detection device that detects an object around a subject vehicle, a rainfall detection device that detects a rainfall state around the subject vehicle, a brightness detection device that detects a brightness around the subject vehicle, and an electronic control unit including a microprocessor and a memory connected to the microprocessor. The microprocessor is configured to perform determining whether a forward vehicle traveling in front of the subject vehicle decelerates, based on an amount of change in a vehicle speed of the forward vehicle detected by the object detection device, a lighting state of a brake lamp of the forward vehicle detected by the object detection device, the rainfall state detected by the rainfall detection device, and the brightness detected by the brightness detection device.

11 Claims, 5 Drawing Sheets

FIG. 4

| DAY/NIGHT | RAINFALL AMOUNT (WIPER OPERATION AMOUNT) | BRAKE LAMP | $\Delta Va$ |
|---|---|---|---|
| DAY | ZERO (OFF) | UNLIT | $\Delta Va0$ |
| | | LIT | $\Delta Va0$ |
| | WEAK RAIN (INTERMITTENT) | UNLIT | $\Delta Va0$ |
| | | LIT | $\Delta Va1$ |
| | STRONG RAIN (LOW) | UNLIT | $\Delta Va1$ |
| | | LIT | $\Delta Va2$ |
| | HEAVY RAIN (HIGH) | UNLIT | $\Delta Va2$ |
| | | LIT | $\Delta Va3$ |
| NIGHT | ZERO (OFF) | UNLIT | $\Delta Va0$ |
| | | LIT | $\Delta Va0$ |
| | WEAK RAIN (INTERMITTENT) | UNLIT | $\Delta Va1$ |
| | | LIT | $\Delta Va2$ |
| | STRONG RAIN (LOW) | UNLIT | $\Delta Va2$ |
| | | LIT | $\Delta Va3$ |
| | HEAVY RAIN (HIGH) | UNLIT | $\Delta Va4$ |
| | | LIT | $\Delta Va5$ |

DECELERATION DETECTION APPARATUS

CROSS-REFERENCE TO RELATED APPLICATION

This application is based upon and claims the benefit of priority from Japanese Patent Application No. 2021-049352 filed on Mar. 24, 2021, the content of which is incorporated herein by reference.

BACKGROUND OF THE INVENTION

Field of the Invention

This invention relates to a deceleration detection apparatus detecting a deceleration of a forward vehicle.

Description of the Related Art

Conventionally, there have been known apparatus that recognize a forward vehicle traveling in front of a subject vehicle by sensor fusion using a radar and a camera and controls an automatic brake system according to the recognition result. Such an apparatus is disclosed, for example, in Japanese Unexamined Patent Publication No. 2005-329779 (JP2005-329779A).

However, it may be difficult to accurately detect the deceleration of the forward vehicle by sensor fusion due to influence of weather, external light, and the like.

SUMMARY OF THE INVENTION

An aspect of the present invention is a deceleration detection apparatus including an object detection device that detects an object around a subject vehicle, a rainfall detection device that detects a rainfall state around the subject vehicle, a brightness detection device that detects a brightness around the subject vehicle, and an electronic control unit including a microprocessor and a memory connected to the microprocessor. The microprocessor is configured to perform determining whether a forward vehicle traveling in front of the subject vehicle decelerates, based on an amount of change in a vehicle speed of the forward vehicle detected by the object detection device, a lighting state of a brake lamp of the forward vehicle detected by the object detection device, the rainfall state detected by the rainfall detection device, and the brightness detected by the brightness detection device.

BRIEF DESCRIPTION OF THE DRAWINGS

The objects, features, and advantages of the present invention will become clearer from the following description of embodiments in relation to the attached drawings, in which:

FIG. 4 is a diagram illustrating a relationship among a brightness, rainfall amount, lighting state of a brake lamp, and threshold, used in the deceleration detection apparatus according to the embodiment of the present invention;

DETAILED DESCRIPTION OF THE INVENTION

Hereinafter, an embodiment of the present invention is explained with reference to FIGS. 1 to 6C. A deceleration detection apparatus according to an embodiment of the invention can be applied to a vehicle with a self-driving capability, i.e., a self-driving vehicle, and a manual driving vehicle without the self-driving capability. In the following, an example of the deceleration detection apparatus applied to the self-driving vehicle is explained. The vehicle to which the deceleration detection apparatus according to the embodiment is applied may be sometimes called "subject vehicle" to differentiate it from other vehicles.

The subject vehicle is an engine vehicle having an internal combustion engine (engine) as a travel drive source, electric vehicle having a travel motor as the travel drive source, or hybrid vehicle having both of the engine and the travel motor as the travel drive source. The subject vehicle can travel not only in a self-drive mode in which a driving operation by a driver is unnecessary, but also in a manual drive mode in which the driving operation by the driver is necessary.

Figure 1:
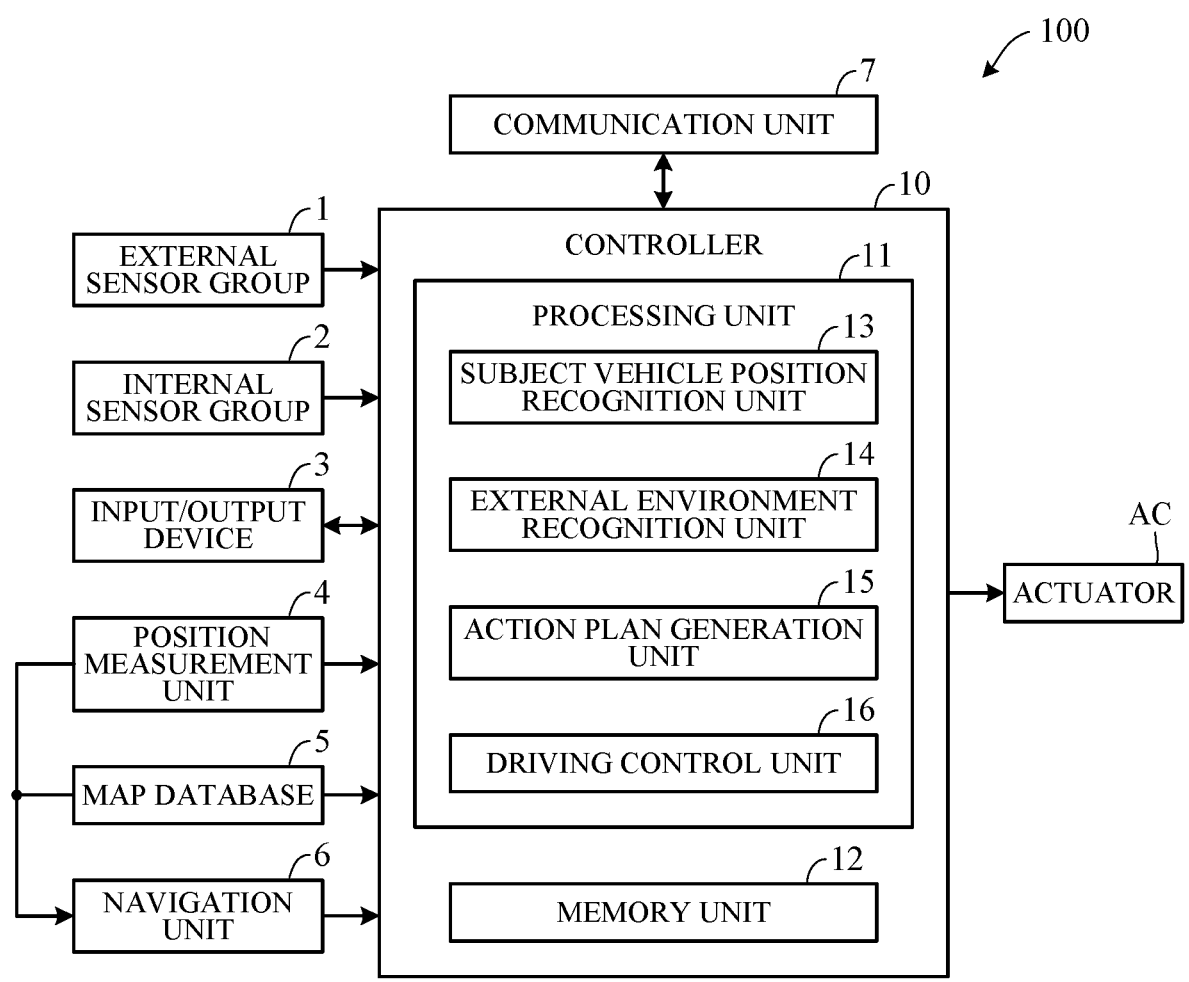
FIG. 1 is a block diagram schematically illustrating an overall configuration of a vehicle control system including a deceleration detection apparatus according to an embodiment of the present invention.

First, the general configuration of the subject vehicle for self-driving will be explained. FIG. 1 is a block diagram schematically illustrating an overall configuration of a vehicle control system 100 including the deceleration detection apparatus according to the embodiment of the present invention. As shown in FIG. 1, the vehicle control system 100 mainly includes a controller 10, and an external sensor group 1, an internal sensor group 2, an input/output device 3, a position measurement unit 4, a map database 5, a navigation unit 6, a communication unit 7 and actuators AC which are communicably connected with the controller 10 via CAN communication or the like.

The term external sensor group 1 herein is a collective designation encompassing multiple sensors (external sensors) for detecting external circumstances constituting subject vehicle ambience data. For example, the external sensor group 1 includes, inter alia, a LiDAR (Light Detection and Ranging) for detecting a position of an object around the subject vehicle (distance and direction to the object from the subject vehicle) by radiating laser light and detecting reflected light, a radar (Radio Detection and Ranging) for detecting the object around the subject vehicle by radiating electromagnetic waves and detecting reflected waves, and a camera for imaging subject vehicle ambience.

The term internal sensor group 2 herein is a collective designation encompassing multiple sensors (internal sensors) for detecting driving state of the subject vehicle. For example, the internal sensor group 2 includes, inter alia, a vehicle speed sensor for detecting vehicle speed of the subject vehicle, acceleration sensors for detecting forward-rearward direction acceleration and lateral acceleration of the subject vehicle, respectively, rotational speed sensor for detecting rotational speed of the travel drive source and the like. The internal sensor group 2 also includes sensors for detecting driver driving operations in manual drive mode, including, for example, accelerator pedal operations, brake pedal operations, steering wheel operations and the like.

The term input/output device 3 is used herein as a collective designation encompassing apparatuses receiving instructions input by the driver and outputting information to the driver. The input/output device 3 includes, inter alia, switches which the driver uses to input various instructions, a microphone which the driver uses to input voice instructions, a display for presenting information to the driver via displayed images, and a speaker for presenting information to the driver by voice. The switches include a self/manual drive select switch for instructing to switch to any of the self-drive mode and the manual drive mode.

The position measurement unit (GNSS unit) 4 includes a position measurement sensor for receiving signal from positioning satellites to measure the location of the subject vehicle. The positioning satellites are satellites such as GPS satellites and Quasi-Zenith satellite. The position measurement unit 4 measures absolute position (latitude, longitude and the like) of the subject vehicle based on signal received by the position measurement sensor.

The map database 5 is a unit storing general map data used by the navigation unit 6 and is, for example, implemented using a magnetic disk or semiconductor element. The map data include road position data and road shape (curvature etc.) data, along with intersection and road branch position data. The map data stored in the map database 5 are different from high-accuracy map data stored in a memory unit 12 of the controller 10.

The navigation unit 6 retrieves target road routes to destinations input by the driver and performs guidance along selected target routes. Destination input and target route guidance is performed through the input/output device 3. Target routes are computed based on current position of the subject vehicle measured by the position measurement unit 4 and map data stored in the map database 35. The current position of the subject vehicle can be measured, using the values detected by the external sensor group 1, and on the basis of this current position and high-accuracy map data stored in the memory unit 12, target route may be calculated.

The communication unit 7 communicates through networks including the Internet and other wireless communication networks to access servers (not shown in the drawings) to acquire map data, travel history information, traffic data and the like, periodically or at arbitrary times. In addition to acquiring travel history information, travel history information of the subject vehicle may be transmitted to the server via the communication unit 7. The networks include not only public wireless communications network, but also closed communications networks, such as wireless LAN, Wi-Fi and Bluetooth, which are established for a predetermined administrative area. Acquired map data are output to the map database 5 and/or memory unit 12 via the controller 10 to update their stored map data.

The actuators AC are actuators for traveling of the subject vehicle. If the travel drive source is the engine, the actuators AC include a throttle actuator for adjusting opening angle of the throttle valve of the engine (throttle opening angle). If the travel drive source is the travel motor, the actuators AC include the travel motor. The actuators AC also include a brake actuator for operating a braking device and turning actuator for turning the front wheels FW.

The controller 10 is constituted by an electronic control unit (ECU). More specifically, the controller 10 incorporates a computer including a CPU or other processing unit (a microprocessor) 51 for executing a processing in relation to travel control, the memory unit (a memory) 12 of RAM, ROM and the like, and an input/output interface or other peripheral circuits not shown in the drawings. In FIG. 1, the controller 10 is integrally configured by consolidating multiple function-differentiated ECUs such as an engine control ECU, a transmission control ECU and so on. Optionally, these ECUs can be individually provided.

The memory unit 12 stores high-accuracy detailed road map data (road map information). The road map information includes information on road position, information on road shape (curvature, etc.), information on gradient of the road, information on position of intersections and branches, information on the number of lanes, information on width of lane and the position of each lane (center position of lane and boundary line of lane), information on position of landmarks (traffic lights, signs, buildings, etc.) as a mark on the map, and information on the road surface profile such as unevennesses of the road surface, etc. The map information stored in the memory unit 12 includes map information acquired from the outside of the subject vehicle through the communication unit 7, and map information created by the subject vehicle itself using the detection values of the external sensor group 1 or the detection values of the external sensor group 1 and the internal sensor group 2.

As functional configurations in relation to mainly self-driving, the processing unit 11 includes a subject vehicle position recognition unit 13, an external environment recognition unit 14, an action plan generation unit 15, and a driving control unit 16.

The subject vehicle position recognition unit 13 recognizes the position of the subject vehicle (subject vehicle position) on the map based on position information of the subject vehicle calculated by the position measurement unit 4 and map information stored in the map database 5. Optionally, the subject vehicle position can be recognized using map information stored in the memory unit 12 and ambience data of the subject vehicle detected by the external sensor group 1, whereby the subject vehicle position can be recognized with high accuracy. Optionally, when the subject vehicle position can be measured by sensors installed externally on the road or by the roadside, the subject vehicle position can be recognized by communicating with such sensors through the communication unit 7.

The external environment recognition unit 14 recognizes external circumstances around the subject vehicle based on signals from cameras, LiDERs, radars and the like of the external sensor group 1. For example, it recognizes position, speed and acceleration of nearby vehicles (forward vehicle or rearward vehicle) driving in the vicinity of the subject vehicle, position of vehicles stopped or parked in the vicinity of the subject vehicle, and position and state of other objects. Other objects include traffic signs, traffic lights, road division lines (white lines, etc.) and stop lines, buildings, guardrails, power poles, commercial signs, pedestrians, bicycles, and the like. Recognized states of other objects include, for example, traffic light color (red, green or yellow) and moving speed and direction of pedestrians and bicycles.

The action plan generation unit 15 generates a driving path (target path) of the subject vehicle from present time point to a certain time ahead based on, for example, a target route computed by the navigation unit 6, map information stored in the memory unit 12, subject vehicle position recognized by the subject vehicle position recognition unit 13, and external circumstances recognized by the external environment recognition unit 14. When multiple paths are available on the target route as target path candidates, the action plan generation unit 15 selects from among them the path that optimally satisfies legal compliance, safe efficient driving and other criteria, and defines the selected path as the target path. The action plan generation unit 15 then generates an action plan matched to the generated target path. An action plan is also called "travel plan". The action plan generation unit 15 generates various kinds of action plans corresponding to overtake traveling for overtaking the forward vehicle, lane-change traveling to move from one traffic lane to another, following traveling to follow the preceding vehicle, lane-keep traveling to maintain same lane, deceleration or acceleration traveling. When generating a target path, the action plan generation unit 15 first decides a drive mode and generates the target path in line with the drive mode.

In self-drive mode, the driving control unit 16 controls the actuators AC to drive the subject vehicle along target path generated by the action plan generation unit 15. More specifically, the driving control unit 16 calculates required driving force for achieving the target accelerations of sequential unit times calculated by the action plan generation unit 15, taking running resistance caused by road gradient and the like into account. And the driving control unit 16 feedback-controls the actuators AC to bring actual acceleration detected by the internal sensor group 2, for example, into coincidence with target acceleration. In other words, the driving control unit 16 controls the actuators AC so that the subject vehicle travels at target speed and target acceleration. On the other hand, in manual drive mode, the driving control unit 16 controls the actuators AC in accordance with driving instructions by the driver (steering operation and the like) acquired from the internal sensor group 2.

Figure 2:
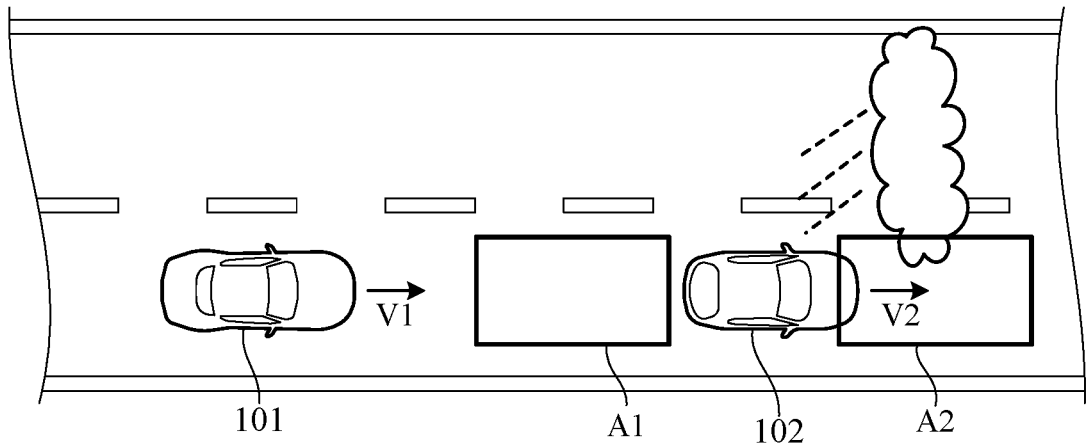
FIG. 2 is a diagram illustrating an example of a travel scene of a subject vehicle including the deceleration detection apparatus according to the embodiment of the present invention.

FIG. 2 illustrates an example in which the subject vehicle 101 travels at a vehicle speed V1 while following the forward vehicle 102 traveling in front of the subject vehicle 101. During the follow-up traveling, the subject vehicle 101 calculates a vehicle speed V2 of the forward vehicle 102 based on signals from the external sensor group 1, and detects deceleration of the forward vehicle 102 based on a change amount ΔV of the vehicle speed V2.

Detection accuracy of the external sensor group 1 including a radar, a LiDAR, and a camera may be affected by weather or light outside the vehicle. For example, when the rainfall amount is extremely large due to concentrated heavy rains, the detection accuracy of the LiDAR is affected by scattering of light due to the rainfall, and the detection accuracy of the radar is also affected. In this case, edge detection by the camera is also affected. Furthermore, if there is a strong light source such as strong solar radiation, the edge detection by the camera is affected, and in a case of back light or if the surroundings are dark at night or the like, the detection accuracy of the camera is also affected.

Under influence of the weather or brightness as described above, the accuracy of the detection values of the external sensor group 1 detected at a predetermined cycle may decrease, and the position of the forward vehicle 102 recognized by the detection values may be temporarily shifted backward (area A1 in FIG. 2) or forward (area A2 in FIG. 2) from the actual position. That is, there is a possibility that instantaneous skipping occurs in the coordinates of the detection values. As a result, the measurement accuracy of deceleration or speed change of the forward vehicle 102 decreases, which may affect follow-up traveling. Therefore, in order to accurately detect a speed change, particularly deceleration, of the forward vehicle 102 without being affected by weather or brightness, the present embodiment configures a deceleration detection apparatus as follows.

Figure 3:
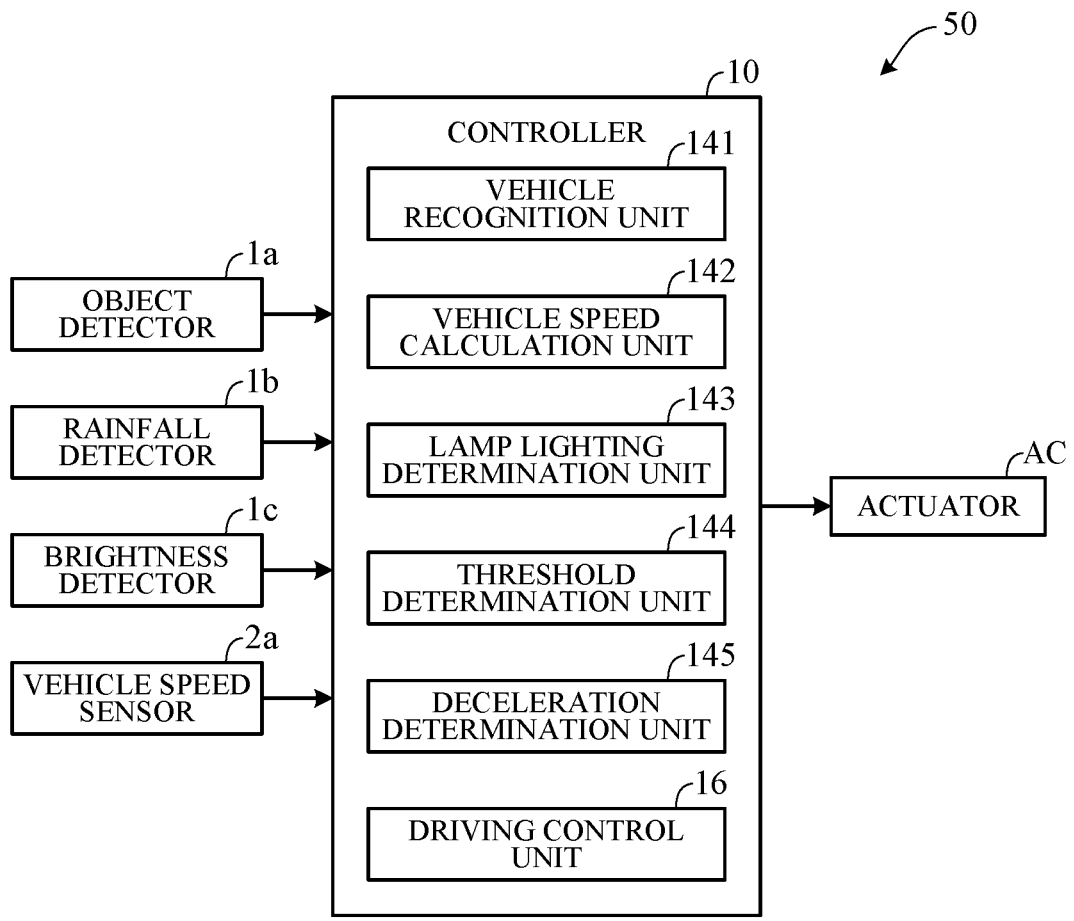
FIG. 3 is a block diagram illustrating a configuration of a substantial part of the deceleration detection apparatus according to the embodiment of the invention.

FIG. 3 is a block diagram illustrating main components of a deceleration detection apparatus 50 according to the embodiment of the present invention. The deceleration detection apparatus 50 is included in the vehicle control system 100 illustrated in FIG. 1. As illustrated in FIG. 3, the deceleration detection apparatus 50 includes an object detector 1a, a rainfall detector 1b, a brightness detector 1c, a vehicle speed sensor 2a, and an actuator AC.

The object detector 1a is a monocular camera having an imaging element (image sensor) such as a CCD or a CMOS, for example, and is included in the external sensor group 1 illustrated in FIG. 1. The camera may be a stereo camera. The camera is attached to, for example, a predetermined position in the front of the subject vehicle 101, continuously captures an image of a space in front of the subject vehicle 101, and acquires an image (camera image) of an object. The object includes the forward vehicle 102, and the camera acquires an image of a brake lamp on the rear side of the forward vehicle 102. The object detector 1a includes any one or both of a radar and a LiDAR in addition to the camera. That is, the object detector 1a includes a distance detector that detects the distance between the subject vehicle 101 and the object (forward vehicle 102).

The rainfall detector 1b is a detector that detects the presence or absence of raindrops and the amount of raindrops (rainfall amount), and can be configured by a raindrop sensor. The raindrop sensor is attached to the outside of the windshield, for example. A wiper sensor that detects the movement of the wiper may be provided, and the rainfall amount may be detected (estimated) by the wiper sensor. The brightness detector 1c is a detector that detects ambient brightness (illuminance), and can be configured by an illuminance sensor. The illuminance sensor is attached to the inside of the windshield, for example. The rainfall detector 1b and the brightness detector also are included in the external sensor group 1 illustrated in FIG. 1. The vehicle speed sensor 2a detects the vehicle speed of the subject vehicle 101. The vehicle speed sensor 2a is included in the internal sensor group 2 illustrated in FIG. 1.

In addition to the driving control unit 16, the controller 10 includes a vehicle recognition unit 141, a vehicle speed calculation unit 142, a lamp lighting determination unit 143, a threshold determination unit 144, and a deceleration determination unit 145, as a functional configuration of the processing unit 11 (FIG. 1). The vehicle recognition unit 141, the vehicle speed calculation unit 142, the lamp lighting determination unit 143, the threshold determination unit 144, and the deceleration determination unit 145 are provided to detect the traveling status of the forward vehicle 102, and are configured by, for example, the external environment recognition unit 14 illustrated in FIG. 1.

The vehicle recognition unit 141 recognizes the presence or absence of the forward vehicle 102 based on the signal from the object detector 1a. For example, the vehicle recognition unit 141 recognizes the forward vehicle 102 when the subject vehicle 101 travels following the forward vehicle 102 with a predetermined inter-vehicle distance. The inter-vehicle distance between the recognized forward vehicle 102 and the subject vehicle 101 is detected by the object detector 1a (distance detector).

The vehicle speed calculation unit 142 calculates a relative vehicle speed $V\alpha (=V1-V2)$ between the vehicle speed V1 of the subject vehicle 101 and the vehicle speed V2 of the forward vehicle 102 by time-differentiating the inter-vehicle distance detected by the object detector 1a. The vehicle speed calculation unit 142 adds the vehicle speed V1 of the subject vehicle 101 detected by the vehicle speed sensor 2a to the relative vehicle speed Vα to calculate the vehicle speed V2 of the forward vehicle 102. The lamp lighting determination unit 143 determines whether the brake lamp on the rear side of the forward vehicle 102 is lit based on the signal from the object detector 1a. The presence or absence of lighting of the brake lamp can be determined by determining whether a red area of a predetermined size or more having a luminance of a predetermined value or more is detected in front of the subject vehicle 101. Therefore, even if the rainfall amount is large or if the brightness of the exterior environment takes on a predetermined value or more, the lamp lighting determination unit 143 can easily and accurately determine the presence or absence of lighting of the brake lamp.

The threshold determination unit 144 determines a threshold of the vehicle speed change amount $\Delta V$ for determining whether the forward vehicle 102 decelerates. More specifically, any threshold $\Delta Va$ is selected from among a plurality of thresholds $\Delta Va$ memorized in advance in the memory unit 12 on the basis of the rainfall amount detected by the rainfall detector 1b, the brightness detected by the brightness detector 1c, and the lighting state of the brake lamp determined by the lamp lighting determination unit 143.

FIG. 4 is a diagram illustrating a relationship among brightness, rainfall amount, lighting state of the brake lamp, and threshold $\Delta Va$. In FIG. 4, the brightness is divided into two stages of day and night. That is, the stage of day is when brightness 1× (illuminance) is equal to or greater than a predetermined value 1×1, and the stage of night is when the brightness 1× (illuminance) is less than the predetermined value 1×1. The rainfall amount is divided into four stages of zero, weak rain, strong rain, and heavy rain. That is, the stage of weak rain is when rainfall amount R is more than 0 and less than a predetermined value R1, the stage of strong rain is when the rainfall amount R is equal to or more than the predetermined value R1 and less than a predetermined value R2 (>R1), and the stage of heavy rain is when the rainfall amount R is equal to or more than the predetermined value R2. The rainfall amount corresponds to an operation amount of the wiper (zero, Intermittent, low, high). Therefore, the threshold $\Delta Va$ may be determined using the operation amount of the wiper instead of the rainfall amount. The lighting state of the brake lamp is divided into two stages of non-lighting and lighting.

The threshold determination unit 144 determines the threshold $\Delta Va$ to any one of $\Delta Va0$ to $\Delta Va5$ by using the relationship illustrated in FIG. 4. The threshold $\Delta Va$ is an absolute value, and has a relationship of $\Delta Va0 > \Delta\Delta a1 > \Delta Va2 > \Delta Va3 > \Delta Va4 > \Delta Va5$. Specifically, when the brightness is in the stage of day and the rainfall amount is zero, the threshold determination unit 144 determines the threshold to be $\Delta Va0$ in both cases of no lighting and lighting of the brake lamp. When the amount of rainfall is in the stage of weak rain, the threshold determination unit 144 determines the threshold to be $\Delta Va0$ if the brake lamp is not lit (unlit), and determines the threshold to be $\Delta\Delta a1$ if the brake lamp is lit. When the amount of rainfall is in the stage of strong rain, the threshold determination unit 144 determines the threshold to be $\Delta\Delta a1$ if the brake lamp is not lit, and determines the threshold to be $\Delta Va2$ if the brake lamp is lit. When the amount of rainfall is in the stage of heavy rain, the threshold determination unit 144 determines the threshold to be $\Delta Va2$ if the brake lamp is not lit, and determines the threshold to be $\Delta Va3$ if the brake lamp is lit.

On the other hand, when the brightness is in the stage of night and the rainfall amount is zero, the threshold determination unit 144 determines the threshold to be $\Delta Va0$ in both cases of no lighting and lighting of the brake lamp. When the amount of rainfall is in the stage of weak rain, the threshold determination unit 144 determines the threshold to be $\Delta\Delta a1$ if the brake lamp is not lit, and determines the threshold to be $\Delta Va2$ if the brake lamp is lit. When the amount of rainfall is in the stage of strong rain, the threshold determination unit 144 determines the threshold to be $\Delta Va2$ if the brake lamp is not lit, and determines the threshold to be $\Delta Va3$ if the brake lamp is lit. When the amount of rainfall is in the stage of heavy rain, the threshold determination unit 144 determines the threshold to be $\Delta Va4$ if the brake lamp is not lit, and determines the threshold to be $\Delta Va5$ if the brake lamp is lit. As described above, as the brightness is lower and the rainfall is greater, the threshold determination unit 144 determines the threshold $\Delta Va$ to be a smaller value. In addition, if the brake lamp is lit except when the rainfall amount is zero, the threshold determination unit 144 determines the threshold $\Delta Va$ to be a smaller value than that if the brake lamp is not lit.

The threshold $\Delta Va$ of the vehicle speed change amount $\Delta V$ is not uniquely determined according to the brightness, the rainfall amount, and the lighting state of the brake lamp, but is determined according to the vehicle speed V1 of the subject vehicle 101, the inter-vehicle distance between the subject vehicle and the forward vehicle, and the like. As an example, the threshold $\Delta Va0$ is about 2 to 3 m/s.

The deceleration determination unit 145 calculates the change amount $\Delta V$ of the vehicle speed V2 of the forward vehicle 102 per unit time calculated by the vehicle speed calculation unit 142. Further, the deceleration determination unit 145 determines a magnitude relationship between the vehicle speed change amount $\Delta V$ and the threshold $\Delta Va$ determined by the threshold determination unit 144. That is, the deceleration determination unit 145 determines whether the vehicle speed change amount $\Delta V$ is equal to or larger than the threshold $\Delta Va$. When $\Delta V > \Delta Va$, the deceleration determination unit 145 determines that the forward vehicle 102 decelerates. This determination is a determination as to whether the subject vehicle 101 is to perform deceleration control, where $\Delta V0$ is set to a value larger than zero. That is, the deceleration determination unit 145 does not strictly determine the presence or absence of deceleration of the forward vehicle 102, but determines the presence or absence of deceleration of the forward vehicle 102 in which the degree of deceleration is a predetermined level or more.

When the deceleration determination unit 145 determines that the forward vehicle 102 decelerates (the deceleration level is equal to or greater than a predetermined value) during follow-up traveling, the driving control unit 16 outputs a control signal to the brake actuator to decelerate the subject vehicle 101. At this time, the driving control unit 16 controls the actuator AC so as to apply a larger braking force as the vehicle speed of the subject vehicle 101 detected by the vehicle speed sensor 2a is faster and as the change rate of the relative vehicle speed (degree of approach) is larger. When the detected deceleration level is less than the predetermined value, the driving control unit 16 issues a command for turning off the accelerator pedal, for example, without driving the brake actuator.

Figure 5:
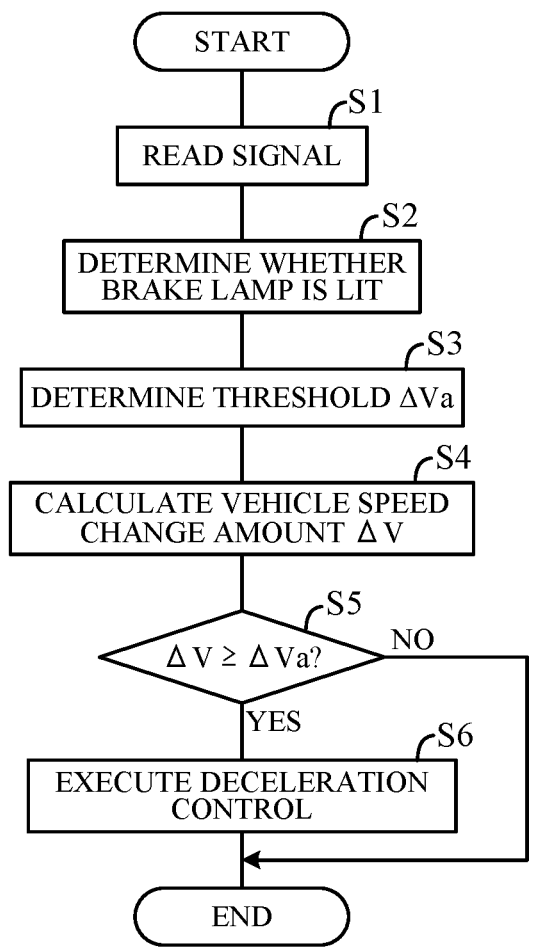
FIG. 5 is a flowchart illustrating an example of processing executed by a controller in FIG. 3.

FIG. 5 is a flowchart illustrating an example of processing executed by the controller 10 of FIG. 3. The processing illustrated in this flowchart is started, for example, when the forward vehicle 102 is recognized during follow-up traveling, and is repeated at a predetermined cycle as long as the follow-up traveling continues.

As illustrated in FIG. 5, first, in S1 (S: processing step), the controller 10 reads signals from the detectors 1*a* to 1*c* and the vehicle speed sensor 2*a*. Then, in S2, the controller 10 determines whether the brake lamp of the forward vehicle 102 is lit based on the signal read in S1 from the object detector 1*a* (camera). Then, in S3, the controller 10 refers to the relationship illustrated in FIG. 4 stored in advance in the memory unit 12 to determine the threshold ΔVa corresponding to the brightness detected by the brightness detector, the rainfall amount detected by the rainfall detector 1*b*, and the lighting state of the brake lamp determined in S2.

Next, in S4, the controller 10 calculates the vehicle speed change amount ΔV of the forward vehicle 102. Specifically, the controller 10 calculates the relative vehicle speed Vα of the forward vehicle 102 to the subject vehicle 101 from the signal from the object detector 1*a*, and adds the vehicle speed V1 of the subject vehicle obtained from the signal from the vehicle speed sensor 2*a* to the relative vehicle speed Vα to calculate the vehicle speed V2 of the forward vehicle 102. The controller 10 calculates the change amount of the vehicle speed V2 per unit time as the vehicle speed change amount ΔV. Next, in S5, the controller 10 determines whether the vehicle speed change amount ΔV calculated in S4 is equal to or greater than the threshold ΔVa determined in S3.

When the determination is in the affirmative in S5, the process proceeds to S6, and when the determination is in the negative, the process passes S6 and is ended. When the determination is in the affirmative in S5, the controller 10 determines that the forward vehicle 102 decelerates. Therefore, in S6, the controller 10 outputs a control signal to the brake actuator to decelerate the subject vehicle 101. That is, the controller 10 executes the deceleration control. Thus, the process is ended.

Figure 6A:
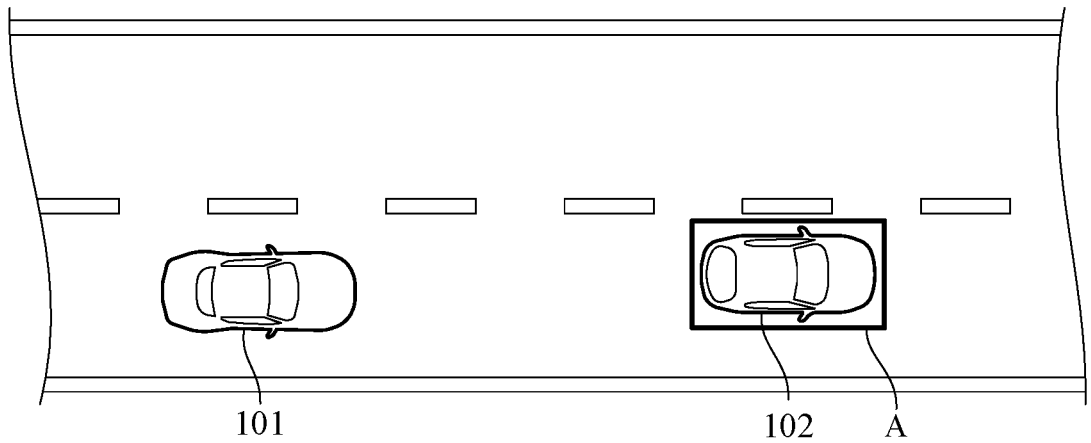
FIG. 6A is a diagram illustrating an example of operation of the deceleration detection apparatus according to the embodiment of the present invention.

The operation of the deceleration detection apparatus 50 according to the present embodiment will be described more specifically. FIG. 6A illustrates an example in which the subject vehicle 101 follows the forward vehicle 102 in a state where the rainfall amount is zero. In this case, the position of the forward vehicle 102 detected by the object detector 1*a* is in an area A, and the position of the forward vehicle 102 can be accurately recognized. Therefore, a normal value (reference value) ΔVa0 is used as the threshold ΔVa for deceleration detection.

Figure 6B:
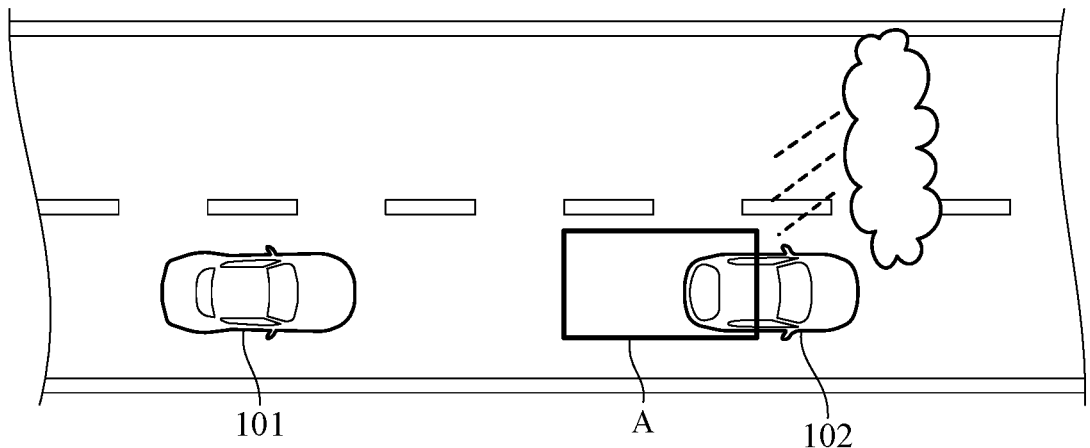
FIG. 6B is a diagram illustrating another example of operation of the deceleration detection apparatus according to the embodiment of the present invention.

FIG. 6B illustrates an example of follow-up traveling in a state where the weather deteriorates (for example, heavy rain). In this case, the position of the forward vehicle 102 detected by the object detector 1*a* is in the area A, and the position of the forward vehicle 102 based on the detection value is detected closer to the subject vehicle than the actual position, and the accuracy of position detection becomes lower. At this time, the threshold ΔVa is set to a value (for example, ΔVa2) smaller than the normal threshold ΔVa0. This makes it easy to detect the deceleration even with a decrease in the accuracy of position detection, whereby the deceleration control is easily performed.

Figure 6C:
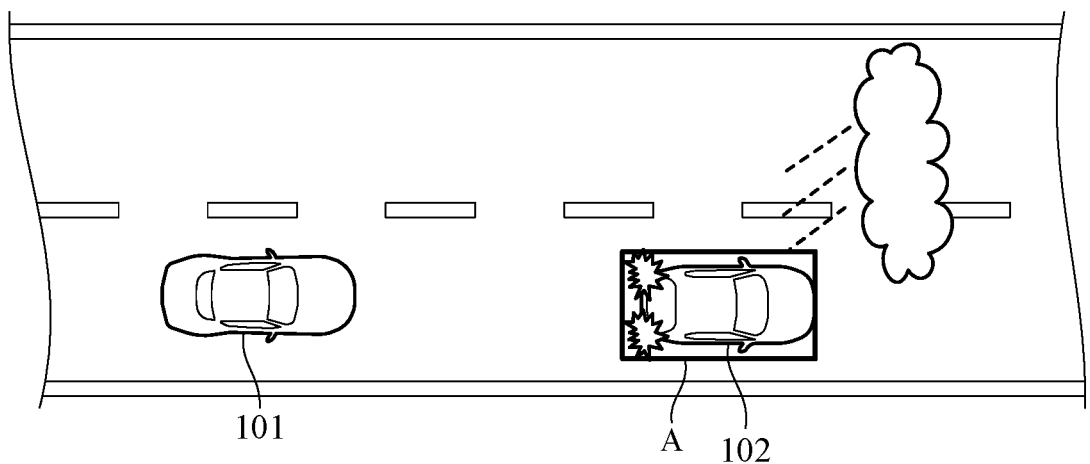
FIG. 6C is a diagram illustrating a further example of operation of the deceleration detection apparatus according to the embodiment of the present invention.

FIG. 6C illustrates another example of follow-up traveling in a state where the weather deteriorates (for example, heavy rain) and the brake lamp of the forward vehicle 102 is lit. In this case, the position of the forward vehicle 102 detected by the object detector 1*a* is in the area A, and the accuracy of position detection is higher than that in FIG. 6B. At this time, the threshold ΔVa is set to a value (for example, ΔVa3) smaller than the threshold ΔVa2 when the brake lamp is not lit. This makes it easier to detect the deceleration during lighting of the brake lamp with which deceleration would almost reliably occur, whereby the deceleration control is more easily performed.

The present embodiment can achieve advantageous effects as follows:

(1) The deceleration detection apparatus 50 includes: the object detector 1*a* that detects an object around the subject vehicle 101; the rainfall detector 1*b* that detects the rainfall state around the subject vehicle 101; the brightness detector 1*c* that detects brightness around the subject vehicle 101; and the deceleration determination unit 145 that determines whether the forward vehicle 102 decelerates, based on the change amount ΔV of the vehicle speed V2 of the forward vehicle 102 traveling in front of the subject vehicle 101 detected by the object detector 1*a*, the lighting state of the brake lamp of the forward vehicle 102 detected by the object detector 1*a* (camera), the rainfall state detected by the rainfall detector 1*b*, and the brightness detected by the brightness detector 1*c* (FIG. 3). Considering the rainfall state, the brightness, and the lighting state of the brake lamp in this manner makes it possible to accurately detect deceleration of the forward vehicle 102.

(2) The deceleration determination unit 145 determines that the forward vehicle 102 decelerates when the change amount ΔV of the vehicle speed V2 of the forward vehicle 102 becomes equal to or greater than the threshold ΔVa set according to the brightness, the rainfall state, and the lighting state of the brake lamp (FIG. 5). This makes it easy to determine whether the forward vehicle 102 decelerates.

(3) The threshold ΔVa is set to the first threshold ΔVa0 when no rainfall is detected by the rainfall detector 1*b* and the lighting of the brake lamp is not detected by the object detector 1*a*. The threshold ΔVa is set to the second threshold (for example, ΔVa2) smaller than Va0 when rainfall is detected by the rainfall detector 1*b* and the lighting of the brake lamp is not detected by the object detector 1*a*. The threshold ΔVa is set to the third threshold (for example, ΔVa3) smaller than ΔVa2 when rainfall is detected by the rainfall detector 1*b* and the lighting of the brake lamp is detected by the object detector 1*a* (FIG. 4). In this way, since the threshold ΔVa is decreased in the case of a rainfall state such as heavy rain (ΔVa0>ΔVa2), it is possible to suppress a delay in the deceleration detection timing of the forward vehicle 102. In addition, since the threshold ΔVa is further decreased when the brake lamp is lit (ΔVa2>ΔVa3), if the brake lamp is lit and the certainty of deceleration is high, deceleration detection is quickly performed so that deceleration control can be executed at an appropriate timing.

The above embodiment may be modified into various forms. Hereinafter, some modifications will be described. In the above embodiment, the forward vehicle 102 is detected by the object detector 1*a* such as a camera, a radar, and a LiDAR. However, the configuration of an object detection device is not limited to the above-described one. In the above embodiment, the rainfall state around the subject vehicle 101 is detected by the rainfall detector 1*b*. However, the configuration of a rainfall detection device is not limited to the above-described one. In the above embodiment, the brightness around the subject vehicle 101 is detected by the brightness detector 1*c*. However, the configuration of a brightness detection device is not limited to the above-described one.

In the above embodiment, when the change amount ΔV of the vehicle speed V2 of the forward vehicle 102 becomes equal to or greater than the threshold ΔVa set according to the brightness, the rainfall state, and the lighting state of the brake lamp, the deceleration determination unit 145 determines that the forward vehicle 102 decelerates, and the deceleration control is performed. However, a deceleration determination unit may be configured in any manner as long as it determines whether the forward vehicle decelerates on the basis of an amount of change in the vehicle speed, a lighting state of the brake lamp, a rainfall state, and a brightness. In the above embodiment, the relationship among the brightness, the rainfall state, the lighting state of the brake lamp, and the plurality of thresholds ΔVa0 to ΔVa5 is memorized in advance in the memory unit 12, and the threshold ΔVa to be used for determination of deceleration control is determined using this relationship. However, the threshold ΔVa may be determined by performing predetermined calculation using the brightness, the rainfall state, and the lighting state of the brake lamp as parameters. The relationship in FIG. 4 is an example, and the threshold ΔVa may be determined with the brightness and the rainfall state divided into more stages or fewer stages.

In the above embodiment, when the deceleration of the forward vehicle 102 is detected, the deceleration control of the subject vehicle 101 is performed. However, the driver may be notified of the deceleration of the forward vehicle 102 via a monitor or the like. As a result, when the subject vehicle 101 travels by manual driving, the driver can perform the brake operation at an appropriate timing.

The present invention can also be used as a deceleration detection method including detecting an object around a subject vehicle 101, detecting a rainfall state around the subject vehicle 101, detecting a brightness around the subject vehicle 101, and determining whether a forward vehicle 102 traveling in front of the subject vehicle 101 decelerates, based on an amount of change in a vehicle speed of the forward vehicle 102 detected in the detecting of the object, a lighting state of a brake lamp of the forward vehicle 102 detected in the detecting of the object, the rainfall state detected in the detecting of the rainfall state, and the brightness detected in the detecting of the brightness.

The above embodiment can be combined as desired with one or more of the above modifications. The modifications can also be combined with one another.

According to the present invention, it is possible to accurately detect a deceleration of a forward vehicle even in bad weather conditions.

Above, while the present invention has been described with reference to the preferred embodiments thereof, it will be understood, by those skilled in the art, that various changes and modifications may be made thereto without departing from the scope of the appended claims.

What is claimed is:

1. A deceleration detection apparatus comprising:
an object detection device configured to detect an object around a subject vehicle;
a rainfall detection device configured to detect a rainfall state around the subject vehicle;
a brightness detection device configured to detect a brightness around the subject vehicle; and
an electronic control unit including a microprocessor and a memory connected to the microprocessor, wherein
the microprocessor is configured to perform:
determining whether a forward vehicle traveling in front of the subject vehicle decelerates, based on an amount of change in a vehicle speed of the forward vehicle detected by the object detection device, a lighting state of a brake lamp of the forward vehicle detected by the object detection device, the rainfall state detected by the rainfall detection device, and the brightness detected by the brightness detection device;
setting a predetermined value according to the brightness, the rainfall state, and the lighting state of the brake lamp; and
the determining including determining that the forward vehicle decelerates when the amount of change in the vehicle speed of the forward vehicle becomes equal to or greater than the predetermined value, and
the microprocessor is configured to further perform
the setting including setting the predetermined value to a first predetermined value when no rainfall is detected by the rainfall detection device and a lighting of the brake lamp is not detected by the object detection device, to a second predetermined value smaller than the first predetermined value when the rainfall is detected by the rainfall detection device, the lighting of the brake lamp is not detected by the object detection device, and the brightness detected by the brightness detection device is equal to or more than a predetermined brightness, to a third predetermined value smaller than the second predetermined value when the rainfall is detected by the rainfall detection device and the lighting of the brake lamp is detected by the object detection device, and to a fourth predetermined value smaller than the second predetermined value when the rainfall is detected by the rainfall detection device, the lighting of the brake lamp is not detected by the object detection device, and the brightness detected by the brightness detection device is less than the predetermined brightness.

2. The deceleration detection apparatus according to claim 1, wherein
the rainfall detection device comprises a wiper sensor configured to estimate the rainfall state based on movement of a wiper on the subject vehicle.

3. The deceleration detection apparatus according to claim 1, wherein
the brightness detection device comprises an illuminance sensor attached to an inside of a windshield of the subject vehicle.

4. The deceleration detection apparatus according to claim 1, wherein
the object detection device comprises at least one of a camera configured to capture images in front of the subject vehicle, and a distance detector configured to detect a distance between the forward vehicle and the subject vehicle.

5. The deceleration detection apparatus according to claim 1, wherein
the microprocessor is configured to perform
the setting including setting the predetermined value to the third predetermined value when the rainfall is detected by the rainfall detection device, the lighting of the brake lamp is detected by the object detection device, and the brightness detected by the brightness detection device is equal to or more than the predetermined brightness, and to a fifth predetermined value smaller than the third predetermined value when the rainfall is detected by the rainfall detection device, the lighting of the brake lamp is detected by the object detection device, and the brightness detected by the brightness detection device is less than the predetermined brightness.

6. The deceleration detection apparatus according to claim 1, wherein the second predetermined value and the third predetermined value become smaller along with an increase of an amount of rainfall per unit time.

7. A deceleration detection method comprising:

detecting an object around a subject vehicle;

detecting a rainfall state around the subject vehicle;

detecting a brightness around the subject vehicle;

determining whether a forward vehicle traveling in front of the subject vehicle decelerates, based on an amount of change in a vehicle speed of the forward vehicle, a lighting state of a brake lamp of the forward vehicle, the rainfall state, and the brightness; and setting a predetermined value according to the brightness, the rainfall state, and the lighting state of the brake lamp, wherein the determining includes determining that the forward vehicle decelerates when the amount of change in the vehicle speed of the forward vehicle becomes equal to or greater than the predetermined value, and the setting includes setting the predetermined value to a first predetermined value when no rainfall is detected and a lighting of the brake lamp is not detected, to a second predetermined value smaller than the first predetermined value when the rainfall is detected, the lighting of the brake lamp is not detected, and the brightness is equal to or more than a predetermined brightness, to a third predetermined value smaller than the second predetermined value when the rainfall is detected and the lighting of the brake lamp is detected, and to a fourth predetermined value smaller than the second predetermined value when the rainfall is detected, the lighting of the brake lamp is not detected, and the brightness detected is less than the predetermined brightness.

8. The deceleration detection apparatus according to claim 1, wherein the microprocessor is configured to further perform outputting a control signal to a brake actuator to decelerate the subject vehicle when determining that the forward vehicle decelerates equal to or greater than the predetermined value.

9. The deceleration detection apparatus according to claim 8, wherein the microprocessor is configured to further perform outputting a command to turn off an accelerator pedal of the subject vehicle without driving the brake actuator when determining that the forward vehicle decelerates less than the predetermined value.

10. The method according to claim 7, further comprising outputting a control signal to a brake actuator to decelerate the subject vehicle when determining that the forward vehicle decelerates equal to or greater than the predetermined value.

11. The method according to claim 10, further comprising outputting a command to turn off an accelerator pedal of the subject vehicle without driving the brake actuator when determining that the forward vehicle decelerates less than the predetermined value.

* * * * *